UNITED STATES PATENT OFFICE.

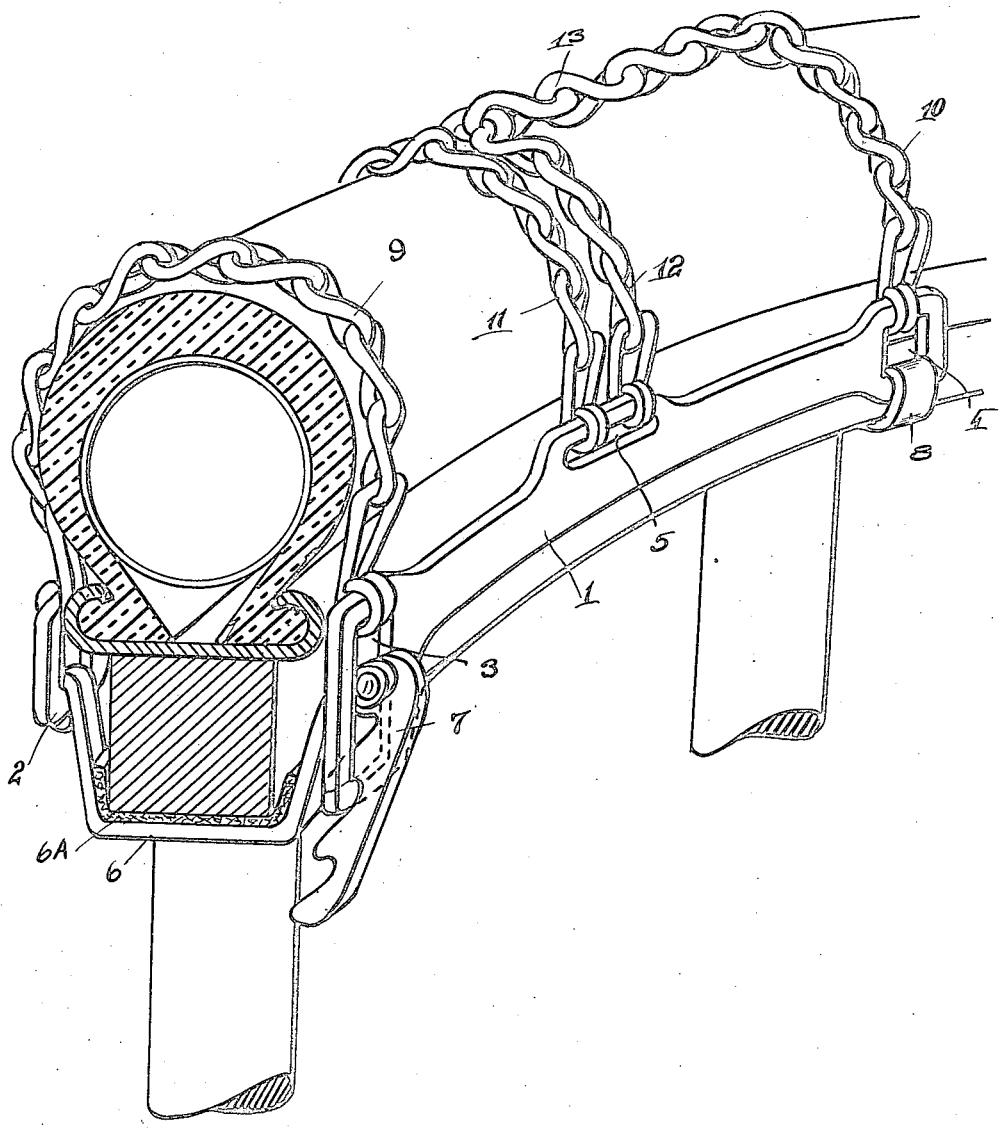

VERNE T. PALMER, OF TUSCARORA, NEW YORK.

TIRE CHAIN.

1,410,715.　　　　Specification of Letters Patent.　Patented Mar. 28, 1922.

Application filed August 29, 1921. Serial No. 496,549.

*To all whom it may concern:*

Be it known that VERNE T. PALMER, a citizen of the United States, residing at Tuscarora, in the county of Livingston and State of New York, has invented certain new and useful Improvements in Tire Chains, of which the following is a specification.

The object of this invention is to provide a new and improved form of tire chain which is adapted to be fastened to a section of the circumference of a tire for the purpose of increasing the traction of the wheel.

This and other objects of this invention will be fully illustrated in the drawings described in the specification and pointed out in the claims at the end thereof.

In the accompanying drawings the figure shows a perspective view of the sectional tire chain as it appears when attached to a portion of the wheel.

The tire chain forming the subject matter of this invention is used mainly for the purpose of increasing the traction of a wheel for a short period when traveling over an especially slippery road or when going up a hill or any other occasion when it is necessary to prevent the slipping of the wheel.

The chain is made up of a pair of connecting bars 1 and 2 which are placed on opposite sides of the felly or rim of the wheel. Each of these bars is provided with the eyes 3 and 4 one at each end of the bars and the eye 5 in the middle of the bars as shown in the drawing. The length of the bars is made long enough so as to span two or more of the spokes at their junction with the felly of the wheel. The bars 1 and 2 are connected together at their ends by means of the U shaped link 6 which is pivoted to the eye of one of the bars and passes under the felly of the wheel to the eye of the other of the connecting bar to which it is locked by means of the locking link 7. The eye to which the free end of the link 6 is locked is preferably made larger so that the locking link 7 can be passed therethrough and then folded back against the link to draw the end thereof through the same eye in order to firmly lock it in place therein.

Instead of the link 6 and its locking lever 7, a leather strap 8 may be used to straddle the under side of the felly and connect the ends of the connecting bars as shown at the right of the figure of the drawing.

The tire of the wheel is spanned by a series of chains which pass from one of the connecting bars to the other at different points thereof. The first of these anti-skidding chains is indicated by reference numeral 9 and is fastened between the eyes 3 of both of the connecting bars 1 and 2. The chain passes up the sides of the tire and over the top thereof as illustrated.

A similar chain 10 is provided between the eyes at the other end of the bars 1 and 2, and straddles the tire in the same manner as chain 9. In the middle of the bars where the eyes 5 are provided a pair of chains 11 and 12 are attached to each of the bars so as to straddle the tire. A connecting chain 13 may be attached between the cross chains at the crown of the tire as illustrated at the right of the figure. This chain will have the tendency to guide the wheel as it rotates and prevent the skidding of the wheel to one side thereof.

The links 6 or straps 8 are located on opposite sides of two spokes of the wheel. In this way the bars and chains are anchored to the section of the wheel to which they are attached and can not slide over the periphery of the wheel.

The sectional tire chain is attached to the wheel whenever a slippery road is encountered or a hill must be climbed. Its easy and quick attachment to the wheel makes it possible to attach the chain without losing much time and when it is desired to take it off again it can be done with a minimum loss of time again. In this way the chain can be used when it is needed and need not be left on the wheel for the whole run as is the practice with chains that encircle the whole perimeter of the tire, and are difficult to apply and take off from the wheel.

I claim:

1. A sectional tire chain comprising a pair of connecting bars having an eye formed at each end and the middle thereof, a link mounted at each of one of said connecting bars, a locking link pivoted to the free end of said links, said locking link being adapted to engage into one of the eyes on one of the bars and draw the end of said link therethrough to lock it in place therein, chains connecting the eyes of one of said bars with the eyes of the other of said bars.

2. A sectional tire chain comprising a pair of connecting bars having an eye formed at each end and the middle thereof, a link mounted at each end of one of said connecting bars, a locking link pivoted to the free end of said links, said locking link being adapted to engage into one of the eyes on one of the bars and draw the end of said link therethrough to lock it in place therein, chains connecting the eyes of one of said bars with the eyes of the other of said bars, a connecting chain parallel to said connecting bars connecting said chains at the crown of the tire.

In testimony whereof I affix my signature.

VERNE T. PALMER.